United States Patent
Chen

(10) Patent No.: US 10,395,120 B2
(45) Date of Patent: Aug. 27, 2019

(54) METHOD, APPARATUS, AND SYSTEM FOR IDENTIFYING OBJECTS IN VIDEO IMAGES AND DISPLAYING INFORMATION OF SAME

(71) Applicant: Alibaba Group Holding Limited, Grand Cayman (KY)

(72) Inventor: Xiao Chen, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 92 days.

(21) Appl. No.: 15/506,347

(22) PCT Filed: Aug. 11, 2015

(86) PCT No.: PCT/CN2015/086619
§ 371 (c)(1),
(2) Date: Feb. 24, 2017

(87) PCT Pub. No.: WO2016/029796
PCT Pub. Date: Mar. 3, 2016

(65) Prior Publication Data
US 2017/0255830 A1    Sep. 7, 2017

(30) Foreign Application Priority Data

Aug. 27, 2014    (CN) .......................... 2014 1 0427527

(51) Int. Cl.
*G06K 9/00* (2006.01)
*G06K 9/46* (2006.01)
(Continued)

(52) U.S. Cl.
CPC ..... *G06K 9/00744* (2013.01); *G06K 9/00718* (2013.01); *G06K 9/4604* (2013.01);
(Continued)

(58) Field of Classification Search
None
See application file for complete search history.

(56) References Cited

U.S. PATENT DOCUMENTS

| 5,259,025 A | 11/1993 | Monroe et al. |
| 5,767,922 A * | 6/1998 | Zabih ................. G06K 9/00711 |
| | | 348/699 |

(Continued)

FOREIGN PATENT DOCUMENTS

| CN | 102232220 A | 11/2011 |
| CN | 102737684 A | 10/2012 |

(Continued)

OTHER PUBLICATIONS

International Search Report to corresponding International Application No. PCT/CN2015/086619 dated Oct. 29, 2015.

*Primary Examiner* — Shervin K Nakhjavan
(74) *Attorney, Agent, or Firm* — James J. DeCarlo; Greenberg Traurig, LLP

(57) ABSTRACT

The disclosure discloses a method and apparatus for identifying objects in paused video images, a method and apparatus for displaying object information on paused video images, and a system for displaying object information on paused video images. The method of identifying objects in paused video images comprises: receiving, from a client, information associated with the paused video images; obtaining, based on the received information associated with the paused video images, the at least one static image corresponding to a paused video of the client; identifying the objects from the at least one static image and obtaining object information; and sending, to the client, identified position information and the object information associated with the objects in the at least one static image. With the solutions provided in the disclosure and by combining client ends and servers, the disclosure achieves the functions of (Continued)

automatically identifying object in paused video images and displaying object information, thereby effectively improving the efficiency and accuracy of advertising in a video play process.

22 Claims, 8 Drawing Sheets

(51) Int. Cl.
*G06Q 30/02* (2012.01)
*G06K 9/62* (2006.01)
*G11B 27/036* (2006.01)
*G11B 27/10* (2006.01)

(52) U.S. Cl.
CPC ......... *G06K 9/4633* (2013.01); *G06K 9/4652* (2013.01); *G06K 9/4671* (2013.01); *G06K 9/6269* (2013.01); *G06Q 30/0277* (2013.01); *G11B 27/036* (2013.01); *G11B 27/102* (2013.01)

(56) References Cited

U.S. PATENT DOCUMENTS

| | | | |
|---|---|---|---|
| 6,546,556 B1 | 4/2003 | Kataoka et al. | |
| 7,325,245 B1* | 1/2008 | Clapper | H04N 21/858 725/54 |
| 8,122,472 B2 | 2/2012 | Krieger et al. | |
| 8,166,500 B2 | 4/2012 | Sakhartov et al. | |
| 8,549,556 B2* | 10/2013 | Rakib | G06F 17/30799 386/249 |
| 8,682,739 B1 | 3/2014 | Feinstein | |
| 8,836,728 B2* | 9/2014 | Tan | H04N 21/45455 345/660 |
| 8,839,131 B2* | 9/2014 | Wallace | G06F 17/30265 715/738 |
| 9,171,442 B2 | 10/2015 | Clements | |
| 9,355,330 B2 | 5/2016 | Chua et al. | |
| 9,380,282 B2* | 6/2016 | Abecassis | H04N 9/8715 |
| 9,390,472 B2* | 7/2016 | Citrin | G06T 3/4038 |
| 9,516,251 B2* | 12/2016 | Welch | H04N 5/44513 |
| 9,532,109 B2 | 12/2016 | Amano et al. | |
| 9,749,710 B2* | 8/2017 | Ramaswamy | H04N 21/812 |
| 2004/0021684 A1* | 2/2004 | Millner | H04N 21/23431 715/719 |
| 2005/0132420 A1* | 6/2005 | Howard | G06F 3/017 725/135 |
| 2007/0005795 A1* | 1/2007 | Gonzalez | G06F 17/30017 709/232 |
| 2007/0078732 A1* | 4/2007 | Crolley | G06Q 30/02 705/26.1 |
| 2007/0250775 A1* | 10/2007 | Marsico | G06F 17/30855 715/716 |
| 2008/0046925 A1* | 2/2008 | Lee | G06F 17/30817 725/37 |
| 2008/0209021 A1* | 8/2008 | Shamma | H04L 65/4015 709/223 |
| 2008/0209075 A1* | 8/2008 | Shamma | H04L 29/06 709/248 |
| 2009/0083815 A1* | 3/2009 | McMaster | H04N 7/17318 725/110 |
| 2009/0285551 A1* | 11/2009 | Berry | G06K 9/00711 386/249 |
| 2009/0300475 A1* | 12/2009 | Fink | H04N 7/17318 715/230 |
| 2009/0300677 A1* | 12/2009 | Zalewski | H04H 20/28 725/38 |
| 2010/0005488 A1* | 1/2010 | Rakib | G06F 17/30799 725/34 |
| 2010/0153831 A1* | 6/2010 | Beaton | G06Q 30/02 715/201 |
| 2010/0205533 A1* | 8/2010 | Nykamp | G06Q 10/10 715/733 |
| 2011/0082735 A1 | 4/2011 | Kannan et al. | |
| 2011/0283309 A1* | 11/2011 | Bliss | H04N 21/4532 725/25 |
| 2012/0197763 A1 | 8/2012 | Moreira | |
| 2012/0232966 A1 | 9/2012 | Calman et al. | |
| 2013/0036438 A1* | 2/2013 | Kutaragi | H04N 21/2743 725/38 |
| 2014/0152847 A1 | 6/2014 | Zomet et al. | |
| 2014/0175162 A1 | 6/2014 | Argue et al. | |
| 2014/0250457 A1* | 9/2014 | Ramaswamy | H04N 21/812 725/34 |
| 2014/0259056 A1* | 9/2014 | Grusd | H04N 21/8583 725/34 |
| 2014/0285717 A1* | 9/2014 | Cai | H04N 21/23418 348/571 |
| 2015/0222682 A1* | 8/2015 | Lewis | H04N 21/44016 715/719 |
| 2015/0245103 A1* | 8/2015 | Conte | H04N 21/47815 725/60 |
| 2015/0296250 A1* | 10/2015 | Casper | H04N 21/4316 725/34 |
| 2015/0350707 A1* | 12/2015 | Reynolds | H04N 21/2668 725/34 |
| 2016/0057492 A1 | 2/2016 | Jaffe et al. | |

FOREIGN PATENT DOCUMENTS

| | | |
|---|---|---|
| CN | 102802055 A | 11/2012 |
| CN | 103020173 A | 4/2013 |
| CN | 103297840 A | 9/2013 |
| CN | 103533383 A | 1/2014 |
| CN | 103929653 A | 7/2014 |

* cited by examiner

METHOD, APPARATUS, AND SYSTEM FOR IDENTIFYING OBJECTS IN VIDEO IMAGES AND DISPLAYING INFORMATION OF SAME

CROSS-REFERENCE TO RELATED APPLICATIONS

This application claims the benefit of priority of Chinese Patent Application No. 201410427527.2, filed on Aug. 27, 2014 and PCT Application No. PCT/CN2015/086619, filed on Aug. 11, 2015, which are incorporated herein in their entirety by reference.

BACKGROUND

Field of Disclosure

The disclosure relates to the field of image identification, and in particular, to systems, methods and apparatuses for identifying objects in paused video images. The disclosure also provides systems, methods and apparatuses for displaying object information in paused video images.

Description of the Related Art

With the development of hardware technologies in terminal devices such as personal computers and mobile phones, more and more users choose to use terminal devices such as personal computers or mobile phones to watch various television programs provided by video websites. The so-called video websites are sites that enable, by using the support of related technical platforms, Internet users to publish, browse, and share video works online in a smooth manner. Well-known video web sites include Youku, LeTV, iQiyi, and the like. Generally, video websites launch respective video client applications (also referred to as video clients), dedicated for playing video works provided by the video websites on terminal devices such as mobile phones or personal computers. Examples of video clients include the Youku video client, iQiyi video client, and the like.

With the rapid growth of video websites, advertisers are starting to favor video advertising. Advertising has become one of the main profit drivers in the business of video websites. Video websites usually push advertisements to terminal users at particular times, such as before video files are played or when videos are paused.

To better attract attention of end users (so that they pay more attention to video advertising), video websites have started to advertise objects (e.g., merchandise) associated with the content of the played videos. That is, at a particular time and image of a video, a promotional picture or a link associated with an object in a current video image is annotated manually (the process is also referred to as "dotting"). The annotated merchandise promotion information is displayed during the process of playing a video, thereby providing targeted promotion of the object that is closely related to the currently played video and thereby attracts users more effectively, as well as improves user experience in receiving advertisements while watching videos.

The described technique of implementing targeted advertising by means of manual dotting has the following disadvantages despite the aforementioned advantages.

First, current techniques involve excessive manual labor. Therefore, when a video file has a relatively large number of objects that need to add annotated information, or when a relatively large number of video files are required for processing, the manual processing speed fails to meet the efficiency requirements.

Second, manually identifying objects in video images and matching the identified objects with existing objects depends on an individual's experience and knowledge of the existing objects. Therefore, in a situation where a large number of objects exist, it is usually impossible to control the accuracy of the identifying and matching process; and consequently, inconsistency between the object information advertised in a video playing process and the object(s) shown in a video image may occur, adversely affecting user experience.

BRIEF SUMMARY

The disclosure provides a method and an apparatus for identifying objects in paused video images, so as to resolve the cost problem in labor works and the incapability of controlling the identification accuracy in the current manual dotting method. The disclosure further provides a method and an apparatus for displaying object information on paused video images, and a system for displaying object information on paused video images.

The disclosure provides a method of identifying an object in paused video images, comprising: receiving, from a client, information associated with the paused video images; obtaining, based on the received information associated with the paused video images, static images corresponding to the paused video of the client; identifying an object from the static images and obtaining object information; and sending, to the client, identified position information and the object information associated with the object in the static images.

Optionally, obtaining static images corresponding to the paused video of the client refers to extracting the static images from the received information associated with the paused video images.

Optionally, obtaining static images corresponding to the paused video of the client comprises: based on a pause time point included in the received information associated with the paused video image, sending a request of obtaining the static image of the video corresponding to the pause time point to a video server providing the video; and receiving, from the video server, the static image corresponding to the pause time point.

Optionally, if the number of frames of the static image included in the received information associated with the paused video images or of the static image sent by the video server is greater than 1, the following operations are performed: obtaining a clarity value of the static image by calculating image edge points and/or calculating image sharpness for each static image frame; and selecting a static image frame with a clarity value meeting a set requirement as a static image for a subsequent processing operation.

Optionally, prior to the step of identifying the object from the static images and obtaining object information, the following steps are performed: obtaining, from the static images, an area showing an image of the object, and using the area as an object image area; and accordingly, the identifying the object from the static images and obtaining object information refers to identifying the object from the obtained object image area and obtaining the object information.

Optionally, obtaining, from the static images, an area showing an image of the object comprises: partitioning the static image into several image areas by using an image segmentation technology; and performing the following operations for each image area: obtaining a feature value used to describe characteristics of the image area; and determining whether the feature value meets a preset feature of the object image area; and if so, determining the image area as the object image area, and a position of the area in the static image being a position, in the static image, of the object shown in the area.

Optionally, the image segmentation technology comprises: an area-based segmentation method or an edge-based segmentation method.

Optionally, identifying the object from the obtained object image area and obtaining the object information comprises: extracting an image feature from the object image area, and using the image feature as a reference feature; searching in a pre-generated object candidate feature library for an object candidate feature matching with the reference feature, and obtaining an object index corresponding to the successfully-matched object candidate feature; and obtaining, based on the object index, information associated with the object.

Optionally, the image feature comprises at least one of the following features: a color feature, a shape feature, a texture feature, or a semantic feature.

Optionally, the step of extracting an image feature from the object image area is performed using a scale-invariant feature transform SIFT algorithm.

Optionally, searching in a pre-generated object candidate feature library for an object candidate feature matching with the reference feature comprises: calculating a feature value difference between the reference feature and each object candidate feature in the object candidate feature library; and using an object candidate feature with its feature value difference meeting a set requirement as the object candidate feature matching with the reference feature.

Accordingly, the disclosure further provides an apparatus for identifying an object in paused video images, comprising a processor and a non-transitory memory storing computer-executable instructions therein that, when executed by the processor, cause the apparatus to: receive, from a client, information associated with the paused video images; obtain, based on the received information associated with the paused video images, static images corresponding to the paused video of the client; identify the object from the static images and obtain object information; and send, to the client, identified position information and the corresponding object information in the static images.

Optionally, the instructions causing the apparatus to obtain at least one static image corresponding to the paused video further comprise instructions causing the apparatus to extract the static image from the received information associated with the paused video image.

Optionally, the instructions causing the apparatus to obtain at least one static image corresponding to the paused video further comprise instructions causing the apparatus to, based on a pause time point included in the received information associated with the paused video image, send a request of obtaining the static image of the video corresponding to the pause time point to a video server providing the video; and receive, from the video server, the static images corresponding to the pause time point.

Optionally, the instructions further cause the apparatus to determine whether the number of frames of the static images is greater than 1; when the number of frames is 'positive', obtain a clarity value of the static image by calculating image edge points and/or calculating image sharpness for each static image frame; and select a static image frame with a clarity value meeting a set requirement as a static image for a subsequent processing operation.

Optionally, the instructions further cause the apparatus to obtain, from the static image, an area showing an object image, and use the area as an object image area; and identify the object from the object image area and obtain the object information.

Optionally, the instructions causing the apparatus to obtain, from the at least one static image, an area including an image of an object, and use the area as an object image area further comprise instructions causing the apparatus to partition the static images into several image areas by using an image segmentation technology; obtain, for each image area, a feature value used to describe characteristics of the image area; and determine, whether the feature value of the image area meets a preset feature of the object image area; and if so, determining the image area as the object image area, and a position of the area in the static image being a position, in the static image, of the object shown in the area.

Optionally, the image segmentation technology comprises: an area-based segmentation method or an edge-based segmentation method.

Optionally, the instructions causing the apparatus to identify objects present in the at least one static image and obtain object information associated with the identified objects further comprise instructions causing the apparatus to extract an image feature from the object image area, and use the image feature as a reference feature; search in a pre-generated object candidate feature library for an object candidate feature matching with the reference feature, and obtain an object index corresponding to the successfully-matched object candidate feature; and obtain, based on the object index, information associated with the object.

Optionally, the instructions causing the apparatus to extract an image feature from the object image area, and use the image feature as a reference feature further comprise instructions causing the apparatus to extract an image feature from the object image area using a scale-invariant feature transform SIFT algorithm.

Optionally, the instructions causing the apparatus to search in a pre-generated object candidate feature library for an object candidate feature matching with the reference feature, and obtain an object index corresponding to the matching object candidate feature further comprise instructions causing the apparatus to calculate a feature value difference between the reference feature and each object candidate feature in the object candidate feature library; and use an object candidate feature with its feature value difference meeting a set requirement as the object candidate feature matching with the reference feature.

Additionally, the disclosure further provides a method of displaying object information on paused video images, comprising: receiving a pause instruction for an online video currently being watched; pausing the video, and sending, to a server, information associated with the paused video, wherein the server is able to obtain static images of the paused video based on the information associated with the paused video; receiving, from the server, position information and object information associated with the object in the static images of the paused video; and displaying, based on the position information, the corresponding object information at a corresponding position in the static images of the paused video.

Optionally, the information associated with the paused video comprises: static images corresponding to the paused video or a pause time point of the paused video.

Optionally, the object information, sent by the server, comprises: object link information, the object link information providing address information for accessing an object details page or a page for purchasing the same object; accordingly, after the displaying the corresponding object information at a corresponding position in the paused video image, performing an operation of adding a 'click to redirect' area corresponding to the object link at the corresponding position; and accordingly, the method further comprises: receiving a click or touch operation performed on the paused video image; and determining whether an area receiving the click or touch operation is the 'click to redirect' area, and if so, obtaining and displaying a corresponding page based on the object link information corresponding to the 'click to redirect' area; and if not, clearing the displayed object information and the 'click to redirect' area, and continuing to play the paused video.

Optionally, if the number of pieces of object information sent by the server is greater than or equal to a preset threshold, screening a specific number of pieces of object information from the object information according to a preset policy; and accordingly, the displaying, based on the position information, the corresponding object information at a corresponding position in the paused video images refers to displaying, based on position information corresponding to each piece of object information obtained via the screening, the object information at a corresponding position in the paused video images.

Accordingly, the disclosure further provides an apparatus for displaying object information on paused video images, comprising a processor and a non-transitory memory storing computer-executable instructions therein that, when executed by the processor, cause the apparatus to: receive a pause instruction for an online video currently being watched; pause the video, and send, to a server, information associated with the paused video, wherein the server is able to obtain static images of the paused video based on the information associated with the paused video; receive, from the server, position information and object information associated with the object in the static images of the paused video; and display, based on the position information, the corresponding object information at a corresponding position in the static images of the paused video.

Optionally, the object information comprises: object link information, the object link information providing address information for accessing an object details page or a page for purchasing the same object; and accordingly, the non-transitory memory storing further includes instructions causing the apparatus to: after the displaying the corresponding object information at a corresponding position in the paused video images, add a 'click to redirect' area corresponding to the object link at the corresponding position; receive a click or touch operation performed on the paused video image; determine whether an area receiving the click or touch operation is the 'click to redirect' area; upon determining that an area receiving the click or touch operation is the 'click to redirect' area, obtain and display a corresponding page based on the object link information corresponding to the 'click to redirect' area; and, upon determining that an area receiving the click or touch operation is not the 'click to redirect' area, clear the displayed object information and the 'click to redirect' area, and continue to play the paused video.

Optionally, the instructions further cause the apparatus: determine whether the number of pieces of object information is greater than or equal to a preset threshold; and, when the number of pieces is 'positive', screen a particular number of pieces of object information from the object information according to a preset policy and corresponding position information; and, based on the position information corresponding to each piece of object information obtained via the screening, display the object information at a corresponding position in the paused video images.

Additionally, the disclosure further provides a system for displaying object information on paused video images, comprising: the apparatus for identifying an object in paused video images according to any one of the preceding claims, the apparatus for displaying object information on paused video images according to any one of the preceding claims, and a video server for providing a video service for the apparatus used for displaying object information on a paused video images.

Optionally, the video server is further configured to provide static images corresponding to a paused video for the apparatus used for identifying an object in paused video images.

As compared with the prior art, the disclosure has the following advantages:

With the technical solutions for displaying object information on paused video images provided in the disclosure, a server obtains, based on the information associated with a paused video sent by a client, static images corresponding to the paused video; automatically identifies an object in the static images and obtains the object information; and sends position information and the object information associated with the object in the static images to the client, so that the client can display the object information on the currently paused video images. With the solutions provided in the disclosure and by combining client ends and servers, the disclosure achieves the functions of automatically identifying objects in paused video images and displaying object information, thereby resolving the problems of high costs and uncontrollable accuracy of manual dotting and annotation, and effectively improving the efficiency and accuracy of advertising in a video play process.

DETAILED DESCRIPTION

Many specific details are provided in the following description, so as to facilitate the full comprehension of the disclosure. However, the disclosure may be implemented by using other methods different from the methods described herein; and those skilled in the art can make similar extension without departing from the conception of the present invention. Therefore, the present invention is not limited to the following disclosed specific implementations.

Disclosed herein are a method and an apparatus for identifying objects in paused video images, a method and an apparatus for displaying object information on paused video images, and a system for displaying object information on paused video images, which are described in detail respectively in the following embodiments.

As used herein, an "object" may correspond to an item of merchandise present within video images such as an article of clothing, a product, furniture, artwork, etc. As discussed previously, many videos include various objects, e.g., merchandise items, as props or parts of a set of the video. Frequently such props are placed intentionally in order to promote the merchandise and/or product. For example, a character in a video may hold a soda can or other object such that the label of the object is clearly or partially visible within the frames of the video. In an alternative example, a character in a video may be wearing an item of clothing with a logo or other identifying mark. In each of these examples, methods and apparatuses are disclosed which allow for the automatic identification of such objects and for the display of information regarding the objects in a paused video as discussed in more detail herein.

Figure 1:
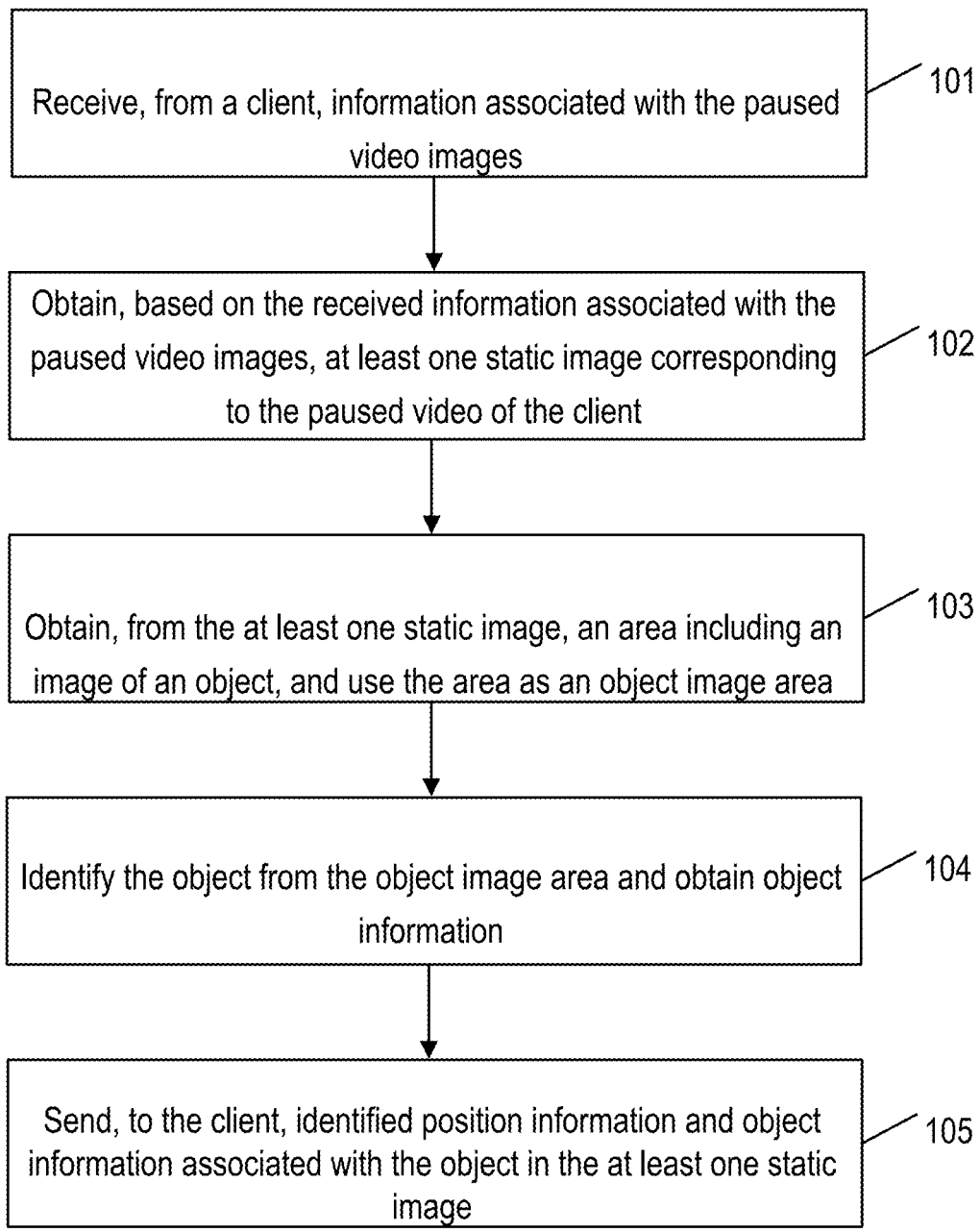
FIG. 1 is a flow diagram illustrating a method for identifying objects in paused video images according to an embodiment of the disclosure.

FIG. 1 is a flow diagram illustrating a method for identifying objects in paused video images according to an embodiment of the disclosure. The method comprises the following steps.

Step 101: Receive, from a client, information associated with a paused video image.

The client receives, from a video server, a video stream and plays the video online in real time. When the play process is paused, the client sends information associated with the paused video to a server that implements a method of identifying objects in paused video images according to the disclosure. The server obtains, based on the information associated with the paused video images, at least one static image corresponding to the paused video of the client, automatically identifies the object in the static images and obtains object information, and sends, position information and the object information associated with the object in the static images to the client. Therefore, the client can display the object information on the paused video images. With the solutions provided in the disclosure and by combining clients and servers, the disclosure achieves the functions of automatically identifying objects in paused video images and displaying object information, thereby effectively improving the efficiency and accuracy of advertising.

To facilitate the description, and to be distinguished from a video server providing a video service to a client, in what follows a server implementing the method of identifying objects in paused video images according to the disclosure is referred to as an advertising server.

In step 101, the advertising server receives, from the client, the information associated with a paused video image. The information associated with the paused video images may include at least one static image corresponding to the paused video. A static image may be obtained by the client via the screenshot function when the video is paused. The information associated with the paused video image may further include a pause time point of the paused video.

Step 102: Obtain, based on the received information associated with the paused video image, at least one static image corresponding to the paused video of the client.

Based on the fact that the received information associated with the paused video images in step 101 might be different, different methods may be used in this step to obtain static images corresponding to the paused video of the client.

Method one: extract a static image from the received information associated with the paused video image.

If the client obtains the static image of the paused video using the screenshot function when the video is paused and sends the static image to the advertising server, the advertising server can, in this step, directly extract the static image corresponding to the paused video from the received data.

Method two: obtain, based on the pause time point, the corresponding static image from the video server.

In this method, the video server sends to the client a video stream selected by a client user for real-time play; at the same time, information associated with the video currently played by the client, such as a video file name and a resource address, may be sent to the advertising server.

After the client pauses playback, the client reports the pause time point of the currently played video to the advertising server; and therefore, the advertising server can obtain, from the video server, at least one static image corresponding to the pause time point. The process specifically comprises the following steps: sending, based on the pause time point included in the received information associated with the paused video image, to the video server providing the video a request of obtaining the at least one static image of the video corresponding to the pause time point, and receiving, from the video server, the at least one static image corresponding to the pause time point.

Both of the methods described above can be used to obtain a static image corresponding to the paused video. In the first method, no interaction with the video server is involved; the client directly uploads the static image and the processing procedure is relatively simple; but the static image obtained by the client using the screenshot function might not be clear enough. In method two, the client merely reports the pause time point to the advertising server; the advertising server obtains the static image by interacting with the video server; and the video server usually selects relatively clear static images corresponding to the pause time point and sends the static images to the advertising server, which in turn helps the advertising server perform a subsequent processing operation such as identifying the object. In a specific implementation process, an appropriate implementation method may be selected according to specific requirements.

No matter which method is used, if the number of frames of the at least one static image provided by the client or of the static images sent by the video server is greater than 1, i.e., the advertising server obtains multiple frames of the static images corresponding to the paused video, a method of calculating image edge points and/or a method of calculating image sharpness may be used to select one image frame with a clarity value meeting a set requirement, and the image frame is used as a static image for a subsequent processing operation. The following further describes the calculation of edge points and the calculation of image sharpness.

Generally, a focused image includes more details as compared with a fuzzy image and a focused image has better clarity. Whether an image is focused can be based on, in a spatial domain, whether an edge and detailed portions of an image are clear. The edge of the image refers to a set of pixels that surround the image and involve gray-scale step changes, and the number of edge points can intuitively reflect an image's focused level. In one embodiment, an edge detection operator may be used to calculate the number of edge points of an image, which is used as a basis for determining whether an image is focused; that is, determining whether an image is clear can be done by using, for example, the "Edge" function in the MATLAB tool and a common edge detection operator to calculate the number of edge points of the image.

Additionally, clarity is a comprehensive reflection of resolution and sharpness. The sharpness (a common name of contrast) is an important factor reflecting image clarity and it is generally believed that an image with higher sharpness is clearer. Sharpness is the edge contrast of an image. In clearer definition, sharpness is related to the amplitude of the derivative of brightness with respect to space. It may be understood that sharpness is equal to a change in output brightness divided by a change in position; that is, visual sharpness is equal to a change in brightness on both sides of a transition area/a change in position of the transition area (i.e., the width of the transition area).

In specific implementation, if the number of frames of the static images provided by the client or of the static images sent by the video server is greater than 1, the clarity of each frame of image may be evaluated by means of calculation of the number of edge points or calculation of the sharpness; or the two methods are combined to comprehensively evaluate the clarity of each image frame, and a static image frame with a clarity value meeting a set requirement is selected as a static image for a subsequent processing operation. The static image frame with a clarity value meeting a set requirement generally refers to a static image frame with the best clarity that is obtained by using the previous evaluation method/methods.

Step 103: Obtain, from the static images, an area including an image of an object, and use the area as an object image area.

In one embodiment, an entire static image may be directly scanned, and the object included in the image may be identified; for example, a static image may only display one object, and therefore, the object can be identified by scanning the entire image. However, taking the following case into consideration, the static image may include a large number of image areas irrelevant to the object, such as the forest, a building, a human being, and the like. In this case, the efficiency of scanning the entire image and identifying the object is relatively low. In order to improve the execution efficiency, the technical solution of this embodiment provides a first implementation method; that is, first obtaining, from the static image, an object image area including an image of an object, and identifying the object in the object image area. This method improves the overall identification efficiency since areas that do not include the image of the object are excluded.

Figure 2:
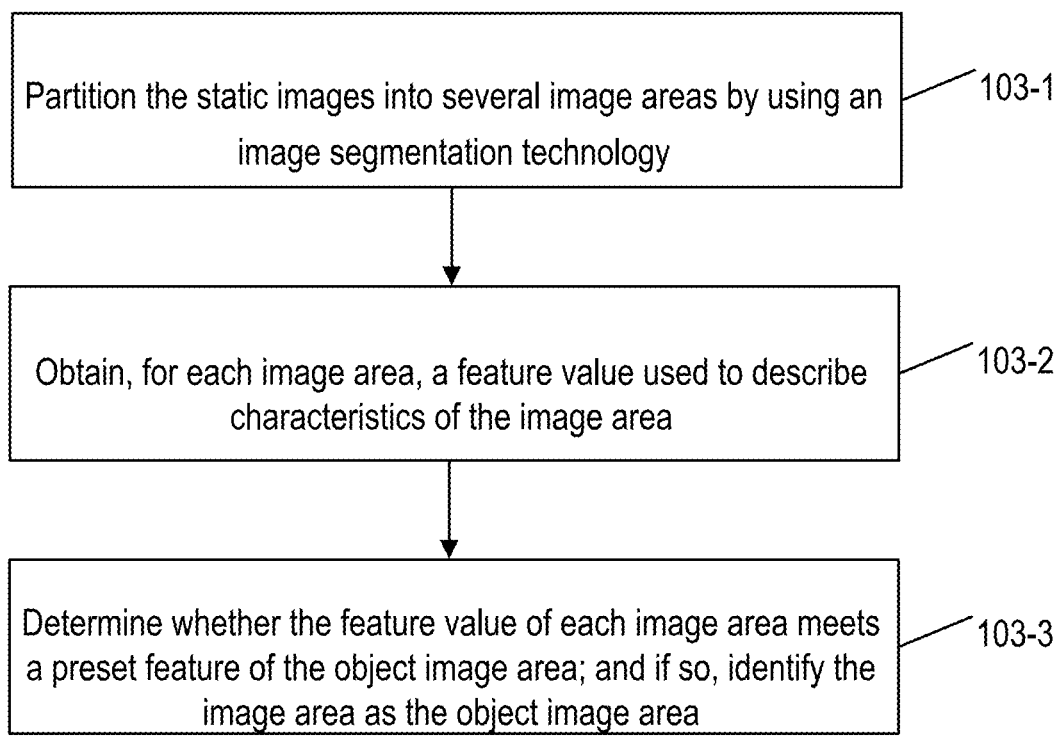
FIG. 2 is a flow diagram illustrating a method for obtaining an object image area according to an embodiment of the disclosure.

The obtaining, from the static images, an object image area comprises the following processes: area partition, feature value calculation, and feature value determination, including the following steps 103-1 to 103-3. The steps are further described below with reference to FIG. 2.

Step 103-1: Partition the static image(s) into several image areas by using an image segmentation technology.

Image segmentation is a technology and a process of partitioning an image into several particular areas with unique characteristics, and is a key step from image processing to image analysis. The image segmentation method of this embodiment comprises: an area-based segmentation method or an edge-based segmentation method.

In area-based segmentation, an area is formed by collecting pixels with similar features. Specifically, a seed pixel is found in each area requiring segmentation; the seed pixel is used as a starting point of growth; pixels in the neighboring areas of the seed pixel that have the same or similar characteristics to those of the seed pixel are assigned to the area of the seed pixel; the newly grown pixels are used as new seed pixels; and the previous process is continued until no pixel meeting the condition can be included; thus, an area is obtained by means of partition. Common area-based segmentation methods include: Meanshift segmentation method, geodesic active contour model, JSEG, and the like.

Another important approach for image segmentation is implemented by means of edge detection. That is, the detection of a place with a sudden change of gray-scale or structure, and the discontinuity may be referred to as an edge, which generally represents an end of an area as well as a beginning of another area. Different images have different gray-scales, and boundaries of the images generally have obvious edges. This feature may be used for image segmentation; in other words, a result of edge detection is used as a basis for image segmentation. Common edge detection operators include: Laplacian-gauss operator, canny operator, log filter operator, Sobel operator, Robert cross operator, Prewitt operator, and the like. Using these operators to perform edge detection and further performing image segmentation is relatively mature in the prior art; and therefore, details are not described herein.

In one embodiment, an appropriate image segmentation method may be selected according to features of the static image. For example, if a boundary of the static image is relatively clear and the boundary can be accurately extracted, the edge-based segmentation method may be selected; and if the static image is relatively fuzzy, the contour is not very clear, and colors in different areas are close to each other, selecting the area-based image segmentation method can achieve a better result. The specific selection of an area segmentation method may be determined according to actual requirements; and a segmentation method other than the aforementioned methods may be used as long as the segmentation method can partition the static images into appropriate image areas.

Step 103-2: Obtain, for each image area, a feature value used to describe characteristics of the image area.

A process of selecting an object image area from multiple image areas obtained from segmentation essentially is a process of image classification; that is, a technical process of sorting each area in the image into several categories according to characteristics or features of the area. To implement the classification function, a feature value used to describe characteristics of the image area may be obtained for each image area.

The feature value of the image area in this step refers to a value for indicating features such as shape, gray-scale, color, and texture of an image area. The values can qualitatively describe or represent characteristics or features of the image areas, and can be used as bases for classifying the image areas. A process of obtaining a feature value of an image area is generally referred to a feature extraction process.

In one embodiment, a corresponding feature extraction algorithm may be used according to actual requirements. For example, feature extraction is performed by using transform methods in mathematics such as wavelet transform and Hough transform; or it can be performed by using the gray-level co-occurrence matrix method, the Laws texture-energy measure, and the like.

Step 103-3: Determine whether the feature value of each image area meets a preset feature of the object image area;

and if so, identify the image area as the object image area, and a position of the area in the static image being a position, in the static image, of the object shown in the area.

Determining whether an image area is the object image area is, in fact, determining whether the feature value describing the characteristics of the image area meets a preset discrimination criterion of the object image area.

In a specific example of this embodiment, first, a number of training samples of known categories are collected, including positive samples, i.e., samples of various images of objects, and negative samples, i.e., samples other than the images of object, such as human body image samples, environment image samples, and the like. One discrimination function and a corresponding discrimination criterion (also referred to as classifier) for determining whether a to-be-detected image is an image of an object is determined by extracting, learning, and training the sample features. Subsequently, in this step, the feature value of each image area obtained by segmentation may be used as an input of the classifier; and the classifier determines, based on the pre-trained discrimination function and the discrimination criterion, whether the image area is the object image area, and outputs a result.

After the object image area is detected in the static images using the previous method, a position of the object image area in the static images may be recorded; the position being a position, in the static images, of the object shown in the object image area.

Step 104: Identify the object from the object image area and obtain object information.

Figure 3:
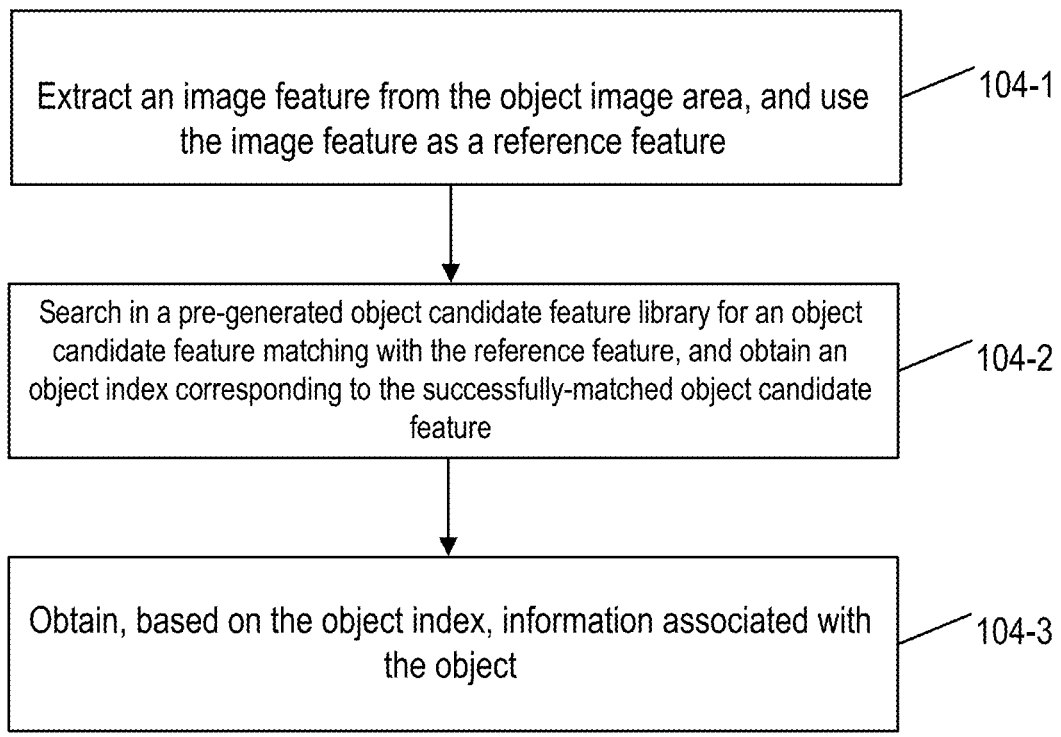
FIG. 3 is a flow diagram illustrating a method for identifying objects in the object image area and obtaining object information according to an embodiment of the disclosure.

In this step, specifically, identifying the object from the object image area and obtaining object information comprise the following processes: feature extraction, feature matching, and object information obtaining, including the following steps 104-1 to 104-3. The steps are further described below with reference to FIG. 3.

Step 104-1: Extract an image feature from the object image area, and use the image feature as a reference feature.

In step 103, the object image area is obtained. In step 104-1, an image feature in the object image area needs to be extracted, so as to prepare for a matching and identification operation described in step 104-2.

The image feature includes low-level features of the image, such as a color feature, a shape feature, and a texture feature, as well as high-level features such as a semantic feature. In a specific implementation process, an image feature, other than the features illustrated above, may be extracted as the reference feature, which merely involves a change in implementation method without deviating from the core idea of the disclosure, and therefore falls within the protection scope of the disclosure.

A different feature extraction algorithm may be used for the image feature extraction; and in the technical solution of this embodiment, the SIFT algorithm is used to extract the image feature in the object image area.

SIFT (Scale-Invariant Feature Transform) algorithm is an image feature extraction algorithm, and is a local feature extraction algorithm widely used currently. SIFT features keep unchanged under conditions of translation, rotation, scale change, and illumination change of an image, and to some extent, they have relatively stable feature matching capabilities for visual angle change and affine transformation; that is, extracting image features by using the SIFT algorithm can remove impacts of transformation factors such as scale change and rotation.

In a specific implementation process, extraction of image features may be performed by using a method provided by OpenCV. OpenCV is a computer vision library that provides multiple algorithms in image processing, computer vision, and artificial intelligence. In a specific example of this embodiment, the image feature in the object image area is extracted by using a detect( ) method in the category of Detector of the OpenCV database.

In a situation where a relatively small number of object categories are involved, one type of image feature may be extracted from the object image area, such as the color feature, the texture feature, or the shape feature. Therefore, in the subsequent step 104-2, the object can be identified by means of a feature matching process. However, considering that there may be a large number of object categories included in the video images, and multiple objects of different categories may have the same color, the same shape, or the same texture. If only one type of feature is extracted, an identification error may easily occur. Therefore, to identify the object in the object image area more accurately, in this step, two or more types of features such as the color feature, the shape feature, the texture feature, and the semantic feature may be extracted as the reference feature for the matching purpose in the subsequent step 104-2.

Step 104-2: Search a pre-generated object candidate feature library for an object candidate feature matching with the reference feature, and obtain an object index corresponding to the successfully-matched object candidate feature.

To implement the function of identifying the object in the paused video images, the server implementing the function may first enter the data of various object image features of different object candidates for matching into the object candidate feature library by using a method similar to the method of step 104-1. For example, features such as the color feature, the texture feature, and the shape feature are extracted for each of candidate object image, and the extracted feature values are stored in the object candidate feature library.

In this step, based on the image feature of the object image area obtained in step 104-1, i.e., the reference feature, the pre-generated object candidate feature library may be searched for an object candidate feature matching with the reference feature. Specifically, a feature value difference between the reference feature and each object candidate feature in the object candidate feature library is calculated; and an object candidate feature with its feature value difference meeting a set requirement is used as the object candidate feature matching with the reference feature. In specific implementation, an object candidate feature having the smallest value difference between itself and the reference feature is used as the object candidate feature matching with the reference feature.

The feature value difference between the reference feature and the object candidate feature is generally referred to as a distance between two images the two features correspond to; that is, a distance between a to-be-identified image of the object (the image in the object image area) and the object candidate image. The value is a quantization value representing the similarity between the previous two images. If the value meets a preset condition, it can be considered, based on the similarity, that the two images are matched, suggesting that the reference feature and the object candidate feature are matched in this step.

In one embodiment, the calculation of the feature value difference between the reference feature and an object candidate feature can be done by the following calculation. The difference between the reference feature and each corresponding feature value of the object candidate feature may be calculated first; the differences obtained from the calculation are integrated using a preset weight, so as to obtain the feature value difference between the reference feature and the object candidate feature. In a specific example of this embodiment, a difference between the reference feature and a color feature value of the object candidate feature, a difference between the reference feature and a texture feature value, and a difference between the reference value and a shape feature value are calculated separately, and the above calculation results are added according to a preset weight, so as to obtain the feature value difference.

In one embodiment, a relatively common image distance measurement formula may be used to calculate the feature value difference between the reference feature and the object candidate feature. In this method, based on the feature values in the reference feature, a feature vector representing the reference feature may be generated by using a preset weight or algorithm; likewise, based on the corresponding feature values in the object candidate feature, a feature vector representing the object candidate feature may be generated by using the same method described earlier; and then a distance between the two feature vectors is calculated by using a distance measurement formula or a function. The distance value obtained via this calculation is the feature value difference between the reference feature and the candidate feature described in this step. Common distance measurement formulas include: Minkowski distance, Manhattan distance, Euclidean distance, weighted Euclidean distance, Chebyshev distance, Mahalanobis distance, and the like.

The above describes two methods of calculating the feature value difference between the reference feature and an object candidate feature in a matching and identification process. Obtaining the feature value difference (also referred to as the degree of difference) between the reference feature and an object candidate feature is a key step in the matching and identification process, and is characterized in feature-dependence. For different images and different categories of extracted image features, an appropriate method may be selected from the above two methods, and the preset weight or calculation formula may be adjusted according to requirements.

By means of the above matching and identification process, an object candidate feature matching with the reference feature is obtained; that is, the object image area includes the object corresponding to the object candidate feature. At this time, the specific object is identified from the object image area.

Further, a corresponding object index may be obtained based on the matched object candidate feature, and is used in a subsequent step to obtain information associated with the identified specific object. In a specific example of this embodiment, a combination of feature values of an object candidate is used as an index of the corresponding object; and therefore, an index of the corresponding object is synchronously obtained when the object candidate feature matching with the reference feature is found.

In one embodiment, in an application scenario where a large number of object candidate image sources exist, suggesting that there are an enormously large number of pieces of candidate objects. Each piece of object candidate includes multiple features, and the above matching and identification process involves the calculation of a difference value between the reference feature and each object candidate feature; as a result, it involves a relatively large amount of calculation. To prevent the relatively large amount of calculation from becoming a bottleneck of system performance, in a specific implementation process, the above calculation task may be implemented by making full use of a data cache technology that improves database access efficiency, and by using clustering, and the like, thereby improving calculation efficiency, shortening a system response time, and identifying the object in the paused video images within a time period acceptable to a client user.

Step 104-3: Obtain, based on the object index, information associated with the object.

A database search operation is performed based on the object index obtained in step 104-2, and the information associated with the object identified from the object image area is obtained, including: object category, name, price, sales ranking, link information for an object details page, or website link information for purchasing the same object on taobao.com.

Step 105: Send, to the client, identified position information and the object information associated with the object in the at least one static image.

When the object included in the static images is identified, the position information of the object in the static images is acquired. For example, a position of the object image area in the static images obtained in step 103 is the position, in the static images, of the object included in the object image area.

The position information and the corresponding object information that is obtained in step 104 are sent to the client, so that the client can display the object information at a corresponding position in the current paused video images.

Figure 4:
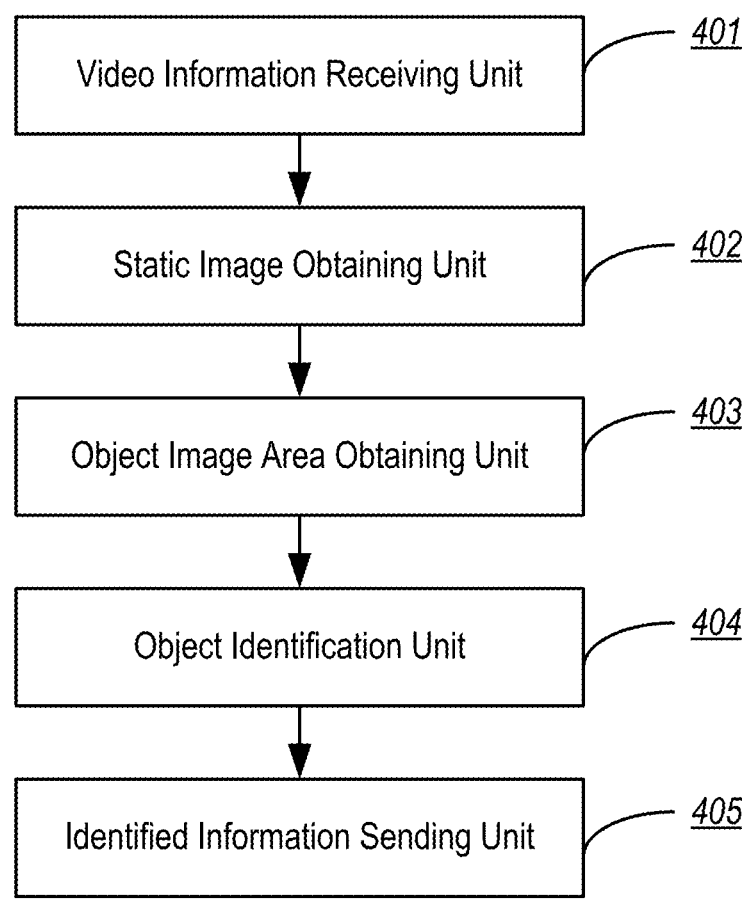
FIG. 4 is a block diagram of an apparatus for identifying objects in paused video images according to an embodiment of the disclosure.

In the above embodiment, a method of identifying objects in paused video images is provided. Accordingly, the disclosure further provides an apparatus for identifying objects in paused video images. FIG. 4 is a block diagram of an apparatus for identifying objects in paused video images according to an embodiment of the disclosure. The embodiment of the apparatus is approximately similar to the embodiment of the method. Therefore, the description of the apparatus is relatively simple, and reference can be made to the description of the method embodiments for related parts. The embodiment of the apparatus described below is merely exemplary.

An apparatus for identifying objects in paused video images according to this embodiment comprises: a video information receiving unit 401, configured to receive, from a client, information associated with the paused video images; a static image obtaining unit 402, configured to obtain, based on the received information associated with the paused video images, static images corresponding to a paused video of the client; an object image area obtaining unit 403, configured to obtain, from the static images, an area including an image of an object, and use the area as an object image area; an object identification unit 404, configured to identify the object in the object image area and obtain object information; and an identified information sending unit 405, configured to send, to the client, identified position information and the object information associated with the object in the static images.

Optionally, the static image obtaining unit is specifically configured to extract the static images from the received information associated with the paused video images.

Optionally, the static image obtaining unit comprises: a request sending subunit, configured to, according to a pause time point included in the received information associated with the paused video images, send a request of obtaining the static images of the video corresponding to the pause time point to a video server providing the video; and a static image receiving subunit, configured to receive, from the video server, the static images corresponding to the pause time point.

Optionally, the apparatus further comprises: an image number determining unit, configured to determine whether the number of frames of the static images obtained by the static image obtaining unit is greater than 1; a clarity value calculation unit, configured to, when a determining result of the image number determining unit is 'positive', obtain a clarity value of the static image by calculating image edge points and/or calculating image sharpness for each static image frame; and a static image selection unit, configured to, based on a calculation result of the clarity calculation unit, select a static image frame with a clarity value meeting a set requirement as a static image for a subsequent processing operation.

Optionally, the object image area obtaining unit comprises: an area segmentation subunit, configured to partition the static images into several image areas by using an image segmentation technology; an area feature value extraction subunit, configured to obtain, for each image area, a feature value used to describe characteristics of the image area; and an object area determining subunit, configured to determine, whether the feature value of the image area meets a preset feature of the object image area; and if so, determining the image area as the object image area, and a position of the area in the static image being a position, in the static image, of the object shown in the area.

Optionally, the image segmentation technology used by the area segmentation subunit comprises: an area-based segmentation method or an edge-based segmentation method.

Optionally, the object identification unit comprises: a feature extraction subunit, configured to extract an image feature from the object image area, and use the image feature as a reference feature; a feature matching subunit, configured to search in a pre-generated object candidate feature library for an object candidate feature matching with the reference feature, and obtain an object index corresponding to the successfully-matched object candidate feature; and an object information obtaining subunit, configured to obtain, based on the object index, information associated with the object.

Optionally, the feature extraction subunit is specifically configured to extract an image feature from the object image area using a scale-invariant feature transform SIFT algorithm.

Optionally, the feature matching subunit comprises: a feature value difference calculation subunit, configured to calculate a feature value difference between the reference feature and each object candidate feature in the object candidate feature library; and a feature value difference determining subunit, configured to use an object candidate feature with its feature value difference meeting a set requirement as the object candidate feature matching with the reference feature.

Figure 5:
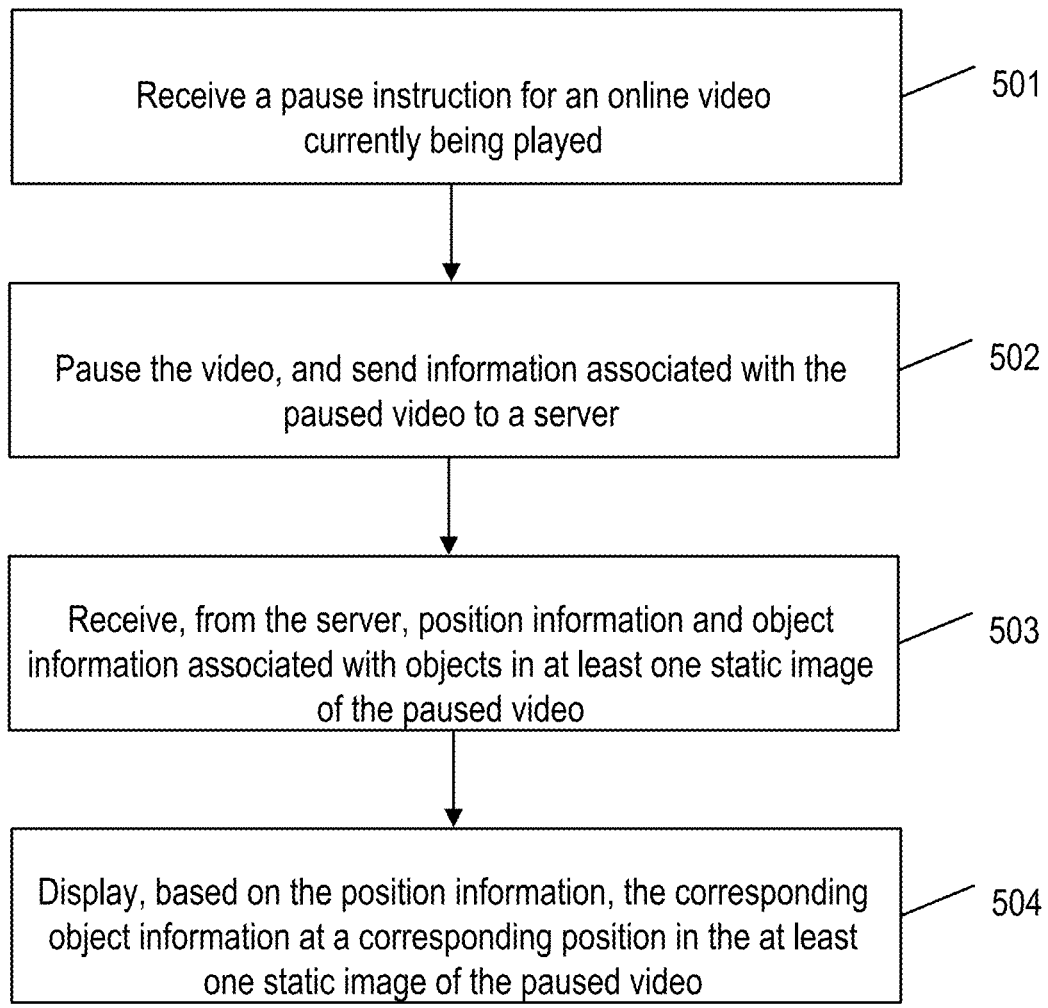
FIG. 5 is a flow diagram illustrating a method for displaying object information on paused video images according to an embodiment of the disclosure.

Corresponding one method of identifying objects in paused video images, the disclosure further provides a method of displaying objects information on paused video images. FIG. 5 is a flow diagram of a method for displaying object information on paused video images according to an embodiment of the disclosure. Parts of this embodiment that are the same as the steps of the embodiment discussed in connection with FIGS. 1 through 3 and such parts are not described herein again, and the following mainly describes the differences. The method of displaying object information on paused video images according to the disclosure comprises:

Step 501: Receive a pause instruction for an online video currently being played.

A client that implements the method of displaying object information on paused video images according to the embodiment of the disclosure receives, from a video server, video data and plays a video in real time. In a play process, if a client user clicks, by means of a mouse or keyboard operation, a button for pausing a play process, or performs a touch operation on a touch screen or a particular area of a touch screen according to a predetermined or preset pause operation method, the client receives a pause instruction for a currently played video.

Step 502: Pause the video, and send information associated with the paused video to a server.

After receiving the pause instruction for the video played online in step 501, the client pauses the currently played video, and sends to an advertising server the information associated with the currently paused video. The advertising server can obtain, based on the information associated with the paused video, at least one static image of the paused video.

The information associated with the paused video provided by the client may include the static images corresponding to the paused video, or may include a pause time point of the paused video. In what follows the methods of how the client obtains the two types of information are described respectively.

To provide the static images corresponding to the paused video to the advertising server, the client may capture video images displayed on a screen when the video is paused. Different client devices may have different methods for capturing screen images. Generally, the capture of screen images is implemented by directly calling a relevant interface function provided by a system. For example, a terminal device playing a video is a personal computer installed with a windows operating system, and an interface provided by some graphics and image class libraries may be used, such as a CopyFromScreen( ) function provided by the Graphics category to implement a function of obtaining screen images from a video RAM; for another example, a terminal device playing a video is a mobile terminal installed with an iOS operating system, and therefore, a UIGraphicsGetImageFromCurrentImageContext( ) function or a UIGetScreenImage( ) function may be used to obtain paused video images displayed on the screen.

The client may provide the pause time point of the currently paused video to the advertising server. For different terminal devices, methods for playing a video are different, and methods for obtaining a pause time point of a currently played video are also different. For example, a WPM (Windows Media Player) plug-in is used to play a video, and therefore, a current pause time point may be obtained by using a currentPosition attribute provided by the plug-in; and for an iOS platform, a function of playing a video is implemented by using an MPMoviePlayerController class, a current pause time point may be obtained by using a relevant interface provided by the class.

After obtaining the static images or the pause time point of the paused video by means of the above method/methods, the client can send the foregoing information to the advertising server. The advertising server can obtain, based on the foregoing information, the static images of the paused video, and identify the object in the static images.

Step 503: Receive, from the server, position information and object information associated with objects in at least one static image of the paused video.

The advertising server identifies, based on the information associated with the paused video provided by the client, the object included in the static images corresponding to the paused video, and sends to the client the position information and the object information associated with the object in the static images of the paused video.

The client receives a response from the server. In addition to the object information and the corresponding position information, the response may further include link information associated with the object. The link information provides address information for accessing an object details page or a page for purchasing the same object.

Step 504: Display, based on the position information, the corresponding object information at a corresponding position in the paused video images.

After receiving the object information and the position information sent by the advertising server, the corresponding object information, such as object name, model, price, sales, and the like can be displayed at the corresponding position in the currently paused video images.

If the number of pieces of object information sent by the advertising server is greater than or equal to a preset threshold, to prevent user experience from being affected by excessive object information displayed on a current display screen, a particular number of pieces of object information may be screened from the multiple pieces of object information according to a preset policy. Based on the corresponding position information of the object information, each piece of object information obtained via screening is displayed at a corresponding position in the paused video images.

The preset policy may be set and adjusted according to specific requirements of implementation. For example, screening may be performed according to distribution positions of objects on the paused video images, so that the displayed object information can be distributed on the display screen in a relatively uniform manner; or if the object information provided by the advertising server includes sales information, several objects with relatively high ranks in a sales list are selected for display. A specific policy for screening is not the core of the disclosure, and therefore the screening is not limited in the disclosure.

Taking visual experience of users into consideration, merely a limited number of pieces of object information can be displayed on the display screen of the currently paused video. To further provide detailed information of objects in which a user is interested, the technical solution of this embodiment provides a 'click to redirect' function; that is, based on a click operation performed by the user on the objects in which the user is interested, the user is redirected to a page associated with the object, so as to display more detailed information, or to provide an opportunity for the user to order and purchase the object.

Implementing the previous function requires two sides. On the one hand, the advertising server needs to provide the link information associated with the object, and description can be found in in step 503; on the other hand, the client needs to detect a click or touch behavior performed by a client user on the object in which the client user is interested, and to perform a redirect operation according to the detected click or touch behavior.

In a specific example of this embodiment, a transparent view is generated on the display screen of the paused video images; concise object information is displayed in an overlapping manner at a corresponding position of the transparent view according to the object and the position information sent by the advertising server; a 'click to redirect' area is added, and the click or touch operation performed by the terminal user on the paused video images is detected; if the detected click or touch operation is performed on the 'click to redirect' area, it indicates that the user is interested in the object displayed at this position, and at this time, based on the obtained link information of the object, the user is redirected to the corresponding page showing object details or the page where the same object can be purchased; and otherwise, the transparent view, and the object information and the redirect area in the view are removed, and continue to play the currently paused video.

Figure 6:
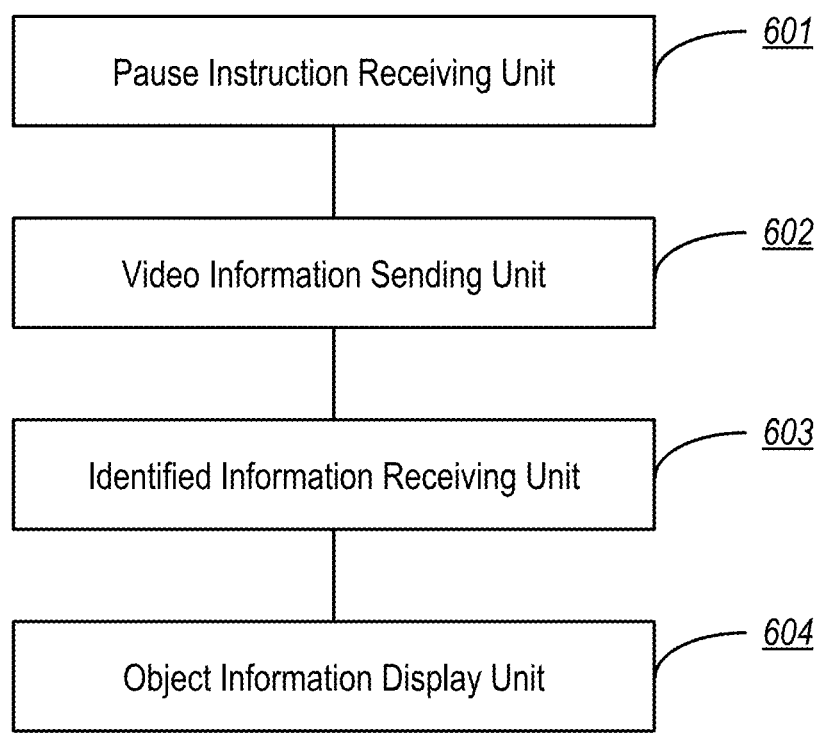
FIG. 6 is a block diagram of an apparatus for displaying object information on paused video images according to an embodiment of the disclosure.

In the above embodiment, a method of displaying object information on paused video images is provided. Accordingly, the disclosure further provides an apparatus for displaying object information on paused video images. FIG. 6 is a block diagram of an apparatus for displaying object information on paused video images according to an embodiment of the disclosure. The embodiment of the apparatus is approximately similar to the embodiment of the method. Therefore, the description of the apparatus is relatively simple, and reference can be made to the description of the method embodiments for related parts. The embodiment of the apparatus described below is merely exemplary.

An apparatus for displaying object information on paused video images according to this embodiment comprises: a pause instruction receiving unit 601, configured to receive a pause instruction for a video played online; a video information sending unit 602, configured to pause the video, and send to a server information associated with the paused video, wherein the server can obtain static images of the paused video based on the information associated with the paused video; an identified information receiving unit 603, configured to receive, from the server, position information and object information associated with objects in the static images of the paused video; and an object information display unit 604, configured to display, based on the position information, the corresponding object information at a corresponding position in the static images of the paused video.

Optionally, the object information received by the identified information receiving unit comprises: object link information, the object link information providing address information for accessing an object details page or a page for purchasing the same object; and accordingly, the apparatus further comprises: a redirect area addition unit, configured to, after the displaying the corresponding object information at a corresponding position in the paused video images, add a 'click to redirect' area corresponding to the object link at the corresponding position; a click and touch operation receiving unit, configured to receive a click or touch operation performed on the paused video images; a redirect determining unit, configured to determine whether an area receiving the click or touch operation is the 'click to redirect' area; a redirect performing unit, configured to, when the redirect determining unit outputs a 'positive' result, obtain and display a corresponding page based on the object link information corresponding to the 'click to redirect' area; and a play resume unit, configured to, when the redirect determining unit outputs a 'negative' result, clear the displayed object information and the 'click to redirect' area, and continue to play the paused video.

Optionally, the apparatus further comprises: an object information determining unit, configured to determine whether the number of pieces of object information received by the identified information receiving unit is greater than or equal to a preset threshold; and an object information screening unit, configured to, when a determining result of the object information determining unit is 'positive', screen a particular number of pieces of object information from the object information according to a preset policy and corresponding position information; and accordingly, the object information display unit is specifically configured to, based on the position information corresponding to each piece of object information obtained via the screening, display the object information at a corresponding position in the paused video images.

Figure 7:
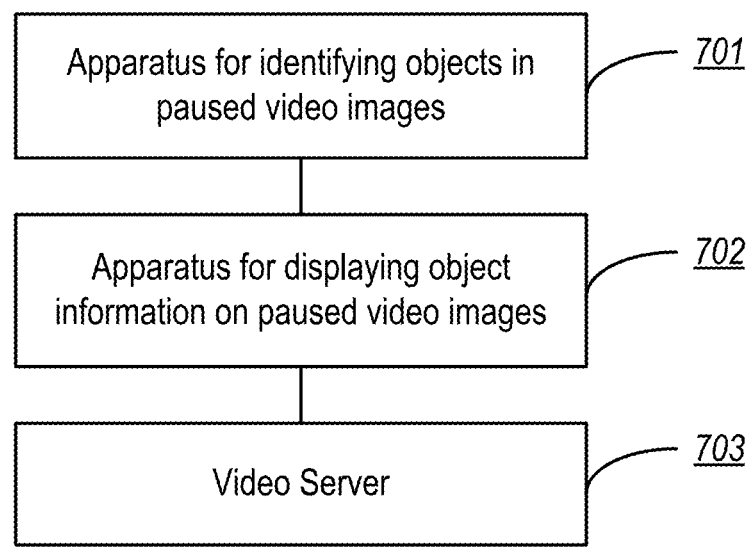
FIG. 7 is a block diagram of a system for displaying object information on paused video images according to an embodiment of the disclosure.

The embodiments of the disclosure further provide a system for displaying object information on paused video images. As shown in FIG. 7, the system comprises the apparatus 701 for identifying objects in paused video images, the apparatus 702 for displaying object information on paused video images according to the previous embodiments, and a video server 703, configured to provide video data to the apparatus for displaying object information on paused video images. The video server is further configured to provide static images corresponding to a paused video to the apparatus for identifying objects in paused video images.

Figure 8:
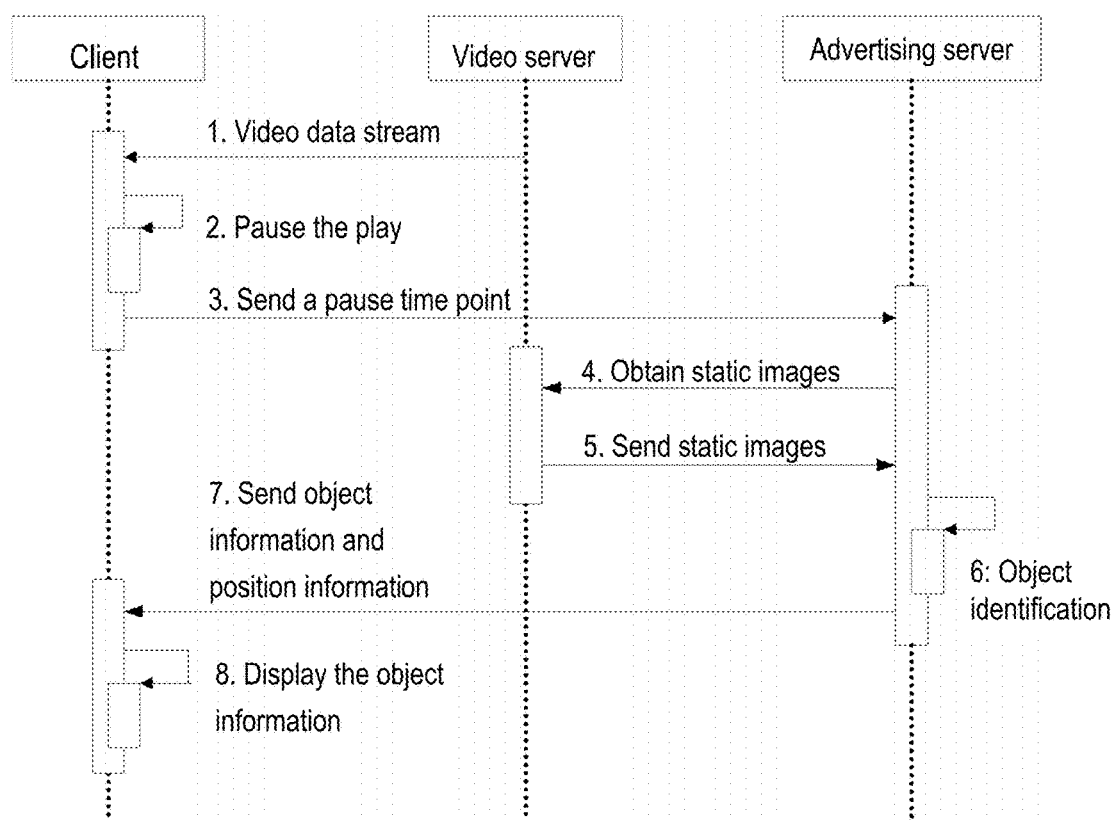
FIG. 8 is a block diagram of a processing procedure of the system for displaying object information on paused video images according to an embodiment of the disclosure.

The apparatus for displaying object information on paused video images may be deployed on various types of terminal devices that can establish connections to the video server and play video data, such as a mobile communication device, a personal computer, a PDA, and an iPad. The apparatus for identifying objects in paused video images is generally deployed on a server, or on a device that is not limited to a server, such as any device capable of implementing the method of identifying the object in paused video images according to the disclosure. The video server is generally referred to as a video website. A processing procedure of the system is described below with reference to FIG. 8.

Using the following case as an example: the apparatus for displaying object information on paused video images is deployed on a smart phone client, and the apparatus for identifying objects in paused video images is deployed on an advertising server. The smart phone client plays, based on the received video data, a video on a display screen of the smart phone in real time, and sends, if receiving a play pause operation in a play process, information about a pause time point of currently paused video images to the advertising server; the advertising server obtains, from a video server after receiving the foregoing information, static images corresponding to the pause time point, and identifies, from the obtained static images, the objects included in the static images, and sends, to the smart phone client, the identified object information and position information associated with the object; the smart phone client displays, based on the received information, the information associated with the object at a corresponding position in the paused video images, and performs, based on a touch operation performed by a user on the screen, a corresponding redirect action, and displays a page for purchasing the same object, thereby helping the user to purchase the object in which the user is interested.

In the processing procedure described above, the client uploads the pause time point. If the request sent by the client to the advertising server carries information about the static images corresponding to the currently paused video, the advertising server can skip the step of obtaining the static images from the video server. In other implementation methods, different processing procedures may be used based on specific needs. Any implementation method that achieves the overall function described in the system of this disclosure where object information can be displayed on paused video images shall fall into the protection scope of this disclosure.

With the technical solutions for displaying object information on paused video images provided in the disclosure, a server obtains, based on the information associated with a paused video sent by a client, static images corresponding to the paused video; automatically identifies objects in the static images and obtains the object information; and sends position information and the object information associated with the objects in the static images to the client, so that the client can display the object information on the currently paused video images. With the solutions provided in the disclosure and by combining client ends and servers, the disclosure achieves the functions of automatically identifying objects in paused video images and displaying object information, thereby resolving the problems of high costs and uncontrollable accuracy of manual dotting and annotation, and effectively improving the efficiency and accuracy of advertising in a video play process.

The exemplary embodiments of the disclosure are described above, but are not intended to limit the disclosure. Those skilled in the art can make possible variations and modifications without departing from the spirit and scope of the disclosure. Therefore, the protection scope of the disclosure shall be subjected to the claims of the disclosure.

In a typical configuration, a computing device includes one or more central processing units (CPU), an input/output interface, a network interface, and a memory.

The memory may comprise computer readable medium in the form of non-permanent memory, random access memory (RAM), and/or non-volatile memory or the like, such as read-only memory (ROM) or flash memory (flash RAM). The memory is an example of a computer readable medium.

The computer-readable medium includes permanent and non-permanent, movable and non-movable media that can achieve information storage by means of any methods or techniques. The information may be computer-readable instructions, data structures, modules of programs, or other data. Examples of storage medium of computer include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital versatile disk (DVD) or other optical storages, magnetic cassette, magnetic tape, magnetic disk storage or other magnetic storage devices, or any other non-transmission medium that can be used for storing information accessible by a computing device. In accordance with the definition in the specification, the computer readable medium does not include transitory media, such as modulated data signals and carrier waves.

It should be understood by those skilled in the art that embodiments of the disclosure may be provided as a method, an apparatus, or a computer program product. Thus, the disclosure may employ the form of a fully hardware embodiment, a fully software embodiment, or an embodiment combining software and hardware aspects. Moreover, the disclosure may employ the form of a computer program product implemented on one or more computer usable storage media (including but not limited to a magnetic disk memory, CD-ROM, an optical memory, etc.) containing computer usable program code therein.

What is claimed is:

1. A method comprising:
receiving, from a client, information associated with a paused video, the information including an identifier of the paused video and a pause time point associated with the paused video displayed on the client;
transmitting, in response to receiving the information associated with a paused video, a request for static images to a video server associated with the identifier of the paused video, the request for static images including the pause time point;
receiving, from the video server, at least one static image corresponding to the paused video in response to the request for static images, the at least one static image comprising a video frame of the paused video associated with the pause time point;
identifying an object present in the at least one static image and obtaining object information associated with the object; and
sending, to the client, the object information and an identified position of the object within the at least one static image.

2. The method of claim 1, wherein obtaining the at least one static image corresponding to the paused video comprises:
detecting that the received information includes the at least one static image; and
extracting the at least one static image from the received information.

3. The method of claim 2, wherein the at least one static image includes a plurality of frames and wherein the method further comprises:
calculating a clarity value for each frame by identifying image edge points or calculating an image sharpness value for each frame; and
selecting, as the at least one static image, a frame from the plurality of frames that has a clarity value meeting a predetermined threshold.

4. The method of claim 1, wherein prior to identifying the object from the at least one static image and obtaining object information, the method further comprises:
obtaining, from the at least one static image, an area including an image of an object, and using the area as an object image area; and
identifying the object present in the object image area and obtaining the object information associated with the object.

5. The method of claim 4, wherein obtaining, from the at least one static image, an area including an image of an object comprises:
partitioning the at least one static image into multiple image areas using an image segmentation method;
obtaining, for each image area, a feature value used to describe characteristics of the image area; and
determining, for each image area, whether the feature value of the image area meets a preset feature of the object image area, and if so, identifying the image area as an object image area, and a position of the image area as a position of an object shown in the image area.

6. The method of claim 5, wherein the image segmentation method comprises: an area-based segmentation method or an edge-based segmentation method.

7. The method of claim 4, wherein identifying the object present in the object image area and obtaining the object information associated with the object comprises:
extracting an image feature from the object image area, and using the image feature as a reference feature;
searching, in a pre-generated object candidate feature library, for an object candidate feature matching with the reference feature, and obtaining an object index corresponding to the matching object candidate feature; and
obtaining, based on the object index, information associated with the identified object.

8. The method of claim 7, wherein the image feature comprises at least one of the following features: a color feature, a shape feature, a texture feature, or a semantic feature.

9. The method of claim 7, wherein extracting an image feature from the object image area is performed using a scale-invariant feature transform.

10. The method of claim 7, wherein searching, in a pre-generated object candidate feature library, for an object candidate feature matching with the reference feature comprises:
calculating a feature value difference between the reference feature and each object candidate feature in the object candidate feature library; and
using an object candidate feature with a feature value difference meeting a set requirement as the object candidate feature matching the reference feature.

11. The method of claim 1 wherein receiving, from a client, information associated with a paused video comprises receiving a pause instruction for a video currently being played at a client device and pausing the video; and wherein the method further comprises displaying, based on the position information, the object information at a corresponding position in the paused video.

12. The method of claim 1, wherein the object information includes object link information providing address information for accessing an object details page or a page for purchasing the object associated with the object information, and wherein the method further comprises:
adding a 'click to redirect' area corresponding to an object link at the corresponding position;
receiving a click or touch operation performed on a paused video image; and
determining whether an area receiving the click or touch operation is the 'click to redirect' area, and
if so, obtaining and displaying a corresponding page based on the object link information corresponding to the 'click to redirect' area, and
if not, clearing the displayed object information, removing the 'click to redirect' area, and continuing to play the paused video.

13. An apparatus comprising:
one or more processors; and
a non-transitory memory storing computer-executable instructions therein that, when executed by the processors, cause the apparatus to perform the operations of:
receiving, from a client, information associated with a paused video, the information including an identifier of the paused video and a pause time point associated with the paused video displayed on the client;
transmitting, in response to receiving the information associated with a paused video, a request for static images to a video server associated with the identifier of the paused video, the request for static images including the pause time point;
receiving, from the video server, at least one static image corresponding to the paused video in response to the request for static images, the at least one static image comprising a video frame of the paused video associated with the pause time point;

identifying an object present in the at least one static image and obtaining object information associated with the object; and sending, to the client, the object information and an identified position of the object within the at least one static image.

14. The apparatus of claim 13, wherein the operation of obtaining the at least one static image corresponding to the paused video comprises:

detecting that the received information includes the at least one static image; and extracting the at least one static image from the received information.

15. The apparatus of claim 13, wherein the at least one static image includes a plurality of frames and wherein the operations further include:

calculating a clarity value for each frame by identifying image edge points or calculating an image sharpness value for each frame; and selecting, as the at least one static image, a frame from the plurality of frames that has a clarity value meeting a predetermined threshold.

16. The apparatus of claim 13, wherein prior to the operation of identifying the object from the at least one static image and obtaining object information, the operations further include:

obtaining, from the at least one static image, an area including an image of an object, and using the area as an object image area; and identifying the object present in the object image area and obtaining the object information associated with the object.

17. The apparatus of claim 16, wherein the operation of obtaining, from the at least one static image, an area including an image of an object includes the operations of:

partitioning the at least one static image into multiple image areas using an image segmentation method;

obtaining, for each image area, a feature value used to describe characteristics of the image area; and determining, for each image area, whether the feature value of the image area meets a preset feature of the object image area, and if so, identifying the image area as an object image area, and a position of the image area as a position of an object shown in the image area.

18. The apparatus of claim 17, wherein the image segmentation method comprises: an area-based segmentation method or an edge-based segmentation method.

19. The apparatus of claim 16, wherein the operation of identifying the object present in the object image area and obtaining the object information associated with the object item includes the operations of:

extracting an image feature from the object image area, and using the image feature as a reference feature;

searching, in a pre-generated object candidate feature library, for an object candidate feature matching with the reference feature, and obtaining an object index corresponding to the matching object candidate feature; and obtaining, based on the object index, information associated with the identified object.

20. The apparatus of claim 19, wherein the image feature comprises at least one of the following features: a color feature, a shape feature, a texture feature, or a semantic feature.

21. The apparatus of claim 19, wherein the operation of extracting an image feature from the object image area is performed using a scale-invariant feature transform.

22. The apparatus of claim 19, wherein the operation of searching, in a pre-generated object candidate feature library, for a object candidate feature matching with the reference feature includes the operations of:

calculating a feature value difference between the reference feature and each object candidate feature in the object candidate feature library; and using an object candidate feature with a feature value difference meeting a set requirement as the object candidate feature matching the reference feature.

* * * * *